UNITED STATES PATENT OFFICE.

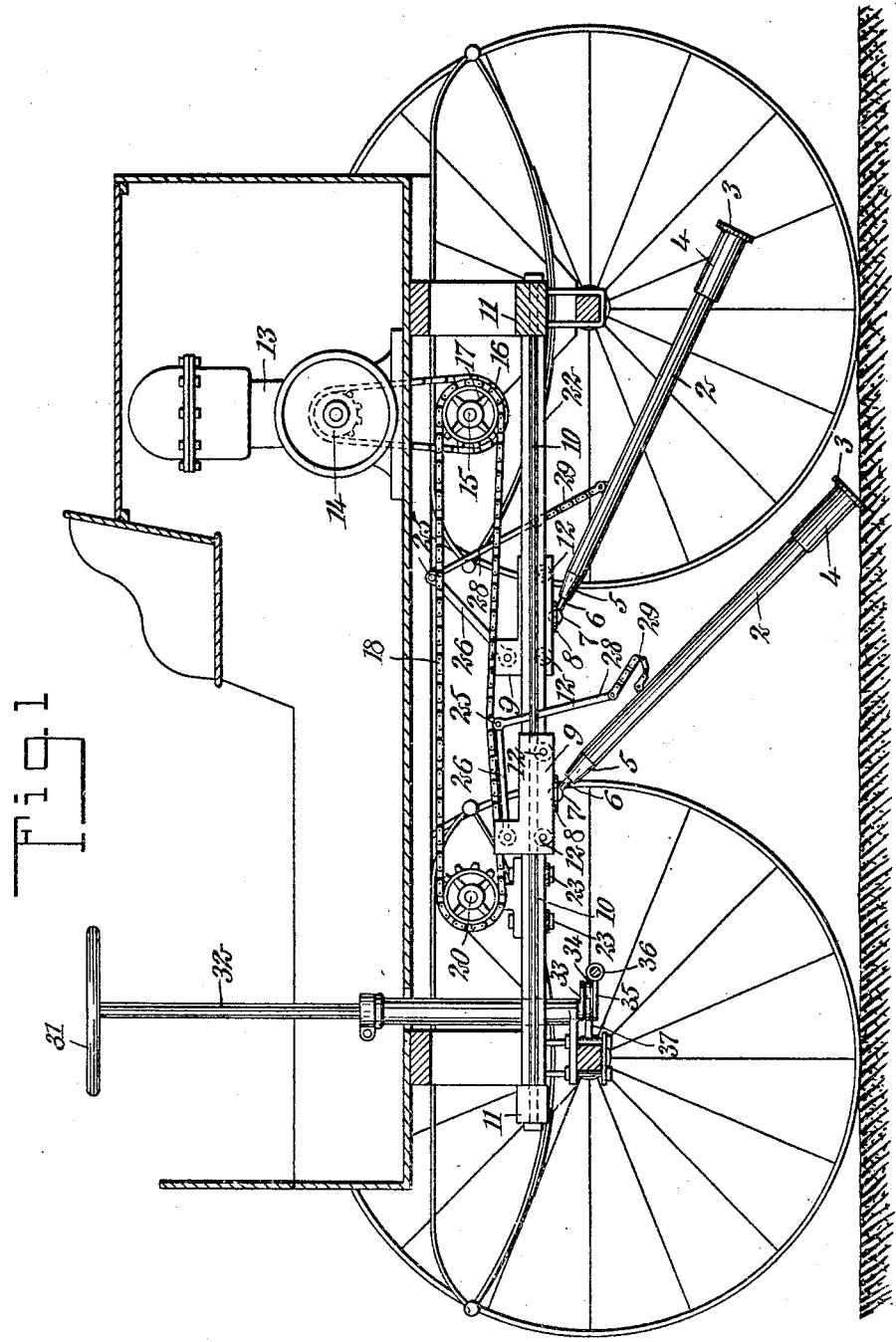

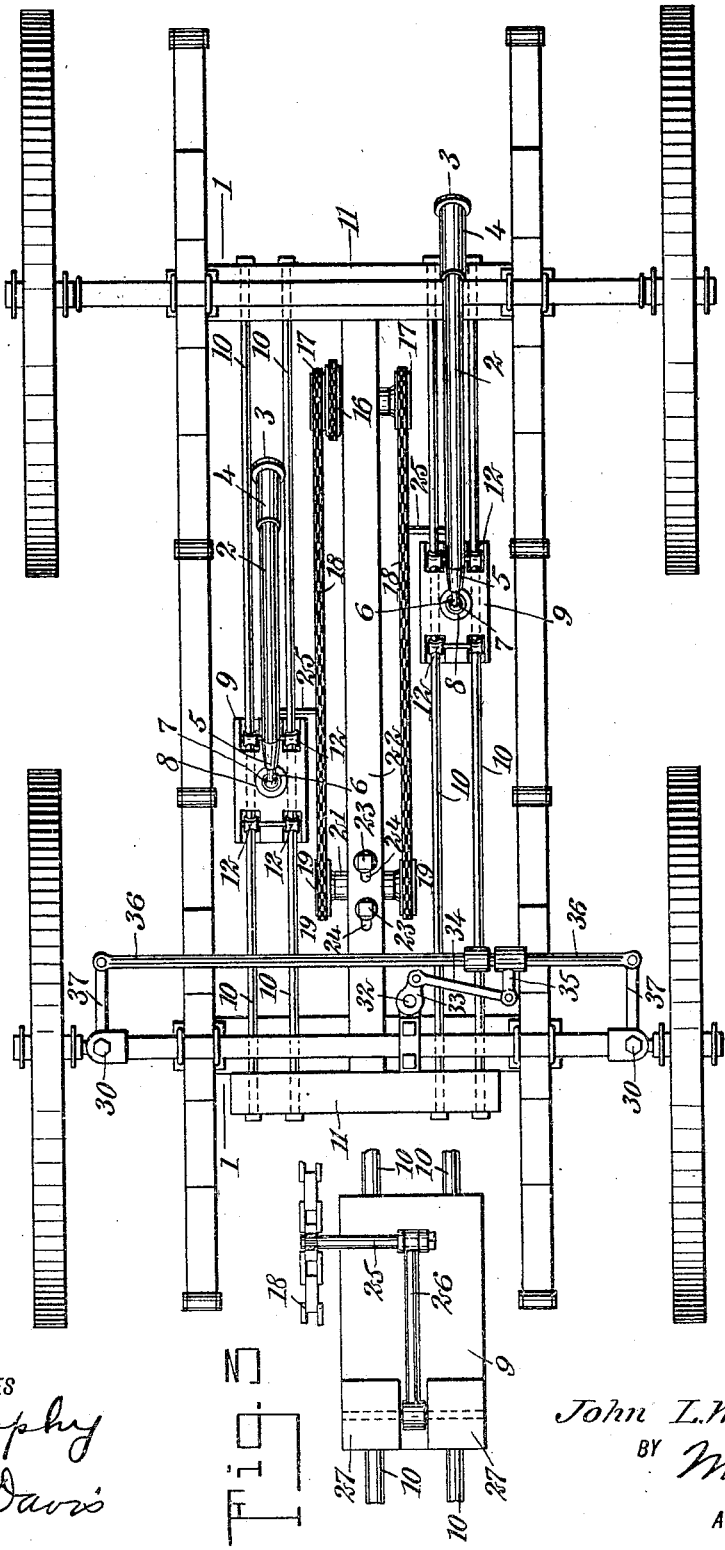

JOHN LEONIDAS WILLIAMS, OF ELLZEY, FLORIDA.

VEHICLE TRACTION MECHANISM.

960,059. Specification of Letters Patent. Patented May 31, 1910.

Application filed April 10, 1909. Serial No. 489,096.

*To all whom it may concern:*

Be it known that I, JOHN LEONIDAS WILLIAMS, a citizen of the United States, residing at Ellzey, county of Levy, State of Florida, have invented a certain new and useful Vehicle Traction Mechanism, of which the following is a full description.

The principal objects which the present invention has in view are:—to provide a mechanism wherein the traction is obtained through members which are positive in their engagement with the ground; to provide a mechanism adapted to operate in broken and unequal ground; and to provide a driving mechanism for the traction devices which is simple, elastic and durable.

In the drawings: Figure 1 is a side elevation of a traction mechanism constructed in accordance with this invention, the body of the vehicle and running gear being shown in section. Fig. 2 is a plan view of a vehicle equipped with a traction mechanism constructed in accordance with this invention, said view being taken from underneath. Fig. 3 is a detail view in top plan of one of the guided reciprocating heads to which the traction members are connected.

This invention differs more especially from the power driven vehicles of the usual type, in that the power is transmitted to members which are pushed against the surface of the ground to engage the same, and by such engagement propel the vehicle. These members as shown in the construction illustrated in the drawings are the poles —2—2—. These poles are provided with the engaging members or feet —3—3—. The poles —2— are constructed preferably from wood, while the feet —3— are shod with metal and have sockets —4—. The upper ends have caps —5—. The caps —5— are provided with extensions —6—, at the ends of which are mounted spherical knobs —7—. The knobs —7— are held within sockets —8—, which are formed in heads —9—9—. The heads —9—9— are suitably mounted on guide rods —10—10— which in turn are stretched between the framing cross bars —11—11— at the forward and rear ends of the vehicle. The heads —9—9— are formed as shown in the drawings, with carrier wheels —12—12—. These carrier wheels are arranged to bear upon the rods —10—10— from underneath to receive the heavy upward pressure exerted upon the heads —9—9—. With the poles —2—2— thus mounted, it will be seen that they are drawn from the rear to the front and from the front to the rear of the vehicle, being guided in their motion by the guide rods —10—10—. The poles —2—2— are formed to any desired length, but in any event are inclined in the position substantially as shown in Fig. 1 of the drawings. When now the heads —9—9— are reciprocated, it will be seen that the poles —2—2— are dragged forward to the front end of the vehicle, the feet —3—3— riding over the surface of the ground. When, however, the heads —9—9— are drawn toward the rear of the vehicle, the feet —3—3— engage the ground. The force now exerted upon the heads —9—9— propels the vehicle forward until the heads —9—9— have advanced to the ends of the rods —10—10—. In other words, the vehicle has been advanced the length of the stroke of the particular pole —2— with which the ground has been engaged.

The vehicle is provided with two or more poles of the character described, to suit varying conditions of work. Any number of poles may be employed. The heads —9—9— are so arranged relatively that a number of the heads are being moved toward the front of the vehicle, equal to those moving, (relatively,) toward the rear of the vehicle. In this manner one or more of the poles is in constant engagement with the ground, and the propulsion of the vehicle carrying the poles is maintained constantly.

The driving mechanism, whereby the heads —9—9— are moved, embodies an internal combustion engine —13—, having a driving sprocket —14—, which is engaged with a sprocket 16, on the driving shaft —15— mounted on the frame of the vehicle. The diameter relation of the sprockets —14— and —16— may be varied at will to change the rate of propulsion of the vehicle. If desired, the usual plurality of pairs of varying sprocket wheels may be employed for transmitting the power from the driving shaft of the engine to the driving shaft —15— of the traction mechanism, whereby the speed of progression of the vehicle may be varied at will.

The driving shaft —15— is provided with the sprockets —17—17—, on which are mounted the sprocket chains —18—18—.

The sprocket chains —18—18— are also carried by sprockets —19—19— mounted on a shaft —20— that is extended through a bearing —21—. The bearing —21— is mounted on the central beam —22— by means of bolts —23—23— that extend through slots —24—24— in the said beam. By loosening the nuts on the bolts —23—, the shaft —20— may be carried forward, the object being to take up any slack or stretch of the chains —18—18—. The nuts on the bolts —23—, when fastened, secure the shaft —20— in any desired position.

It is evident that with this construction whenever the engine —13— is operated, the chains —18—18— are driven constantly and in one direction. These chains are connected to the heads —9—9— by means of connecting pins —25—25—. The pins —25—25— are passed through link blocks of the chains —18—18— and are pivotally connected to the swinging arms —26—26— which are pivotally connected to the heads —9—9— between the bearings —27—27—. The arms —26—26— are of sufficient length to not pass above the center of the head —9— to which each is connected, when the said head is being pushed to the forward end of the vehicle.

The poles —2—2— are connected to the pins —25—25— through the rods —28—28— and the flexible chains —29—29—. It is by means of the rod —28— and chain —29— that each pole —2— is lifted from the ground as the link of the chain —18— which carries the pin —25— passes upward over the sprocket —17— at the rear of the vehicle. In the lifted position—(shown in Fig. 1)—the pole —2— is carried forward until the link of the chain —18— carrying the pin —25— passes down over the sprocket —19— at the forward end of the vehicle. This lowers the link and pin —25— to the lower side of the sprocket —19—, in which position the foot —3— of the rod —2— rests against the surface of the ground—(as shown in Fig. 1 of the drawings,) to engage the same when the head —9— to which it is connected begins to move back toward the rear of the vehicle.

The front or steering wheels of the vehicle are moved around the pivot knuckles —30— by means of the steering wheel —31—. The steering wheel —31— operates through the steering post —32—, the crank arm —33—, the link —34— and the fixed arm —35— mounted on the connecting rod —36—, which latter engages both the knuckle extensions —37—37—.

The particular use for which this vehicle is at present designed is as a tractor for plows and other agricultural implements.

When constructed as above described, the operation is as follows: The motor —13— being started, the chains —18—18— are steadily driven. The reduction in speed from the motor shaft to the shaft —15— of the driving mechanism due to the gearing, is such that the propulsion of the vehicle is slow while the torque of the shaft —15— is proportionately increased. Thus with a comparatively small horse power engine, an increased pulling effect may be produced upon the chains —18—18—. As described, the action of the chains —18—18— upon the poles —2—2— is to raise each at the rearward extremity of its pull; then to advance the same to the limit of the forward position; then to drop the same in such position to engage the ground; and then to draw the vehicle forward until the foot —3— is lifted out of engagement with the ground. Operating in succession, a plurality of poles —2— maintains a steady forward pull on the vehicle.

It will be seen that the feet —3— may be shaped to any desired form or dimension, whereby a vehicle of the character described may be propelled through loose earth, such as is produced in plowing. The vehicle as described may also be used in any of the agricultural pursuits, the method of propulsion being peculiarly adapted for work over ground which has been broken up.

Having thus described this invention, what is claimed is:—

1. A vehicle traction mechanism comprising a motor; a driving shaft mounted crosswise of said vehicle provided with sprocket wheels; sprocket wheels mounted on said vehicle and removed from said driving shaft; sprocket chains mounted on the said sprocket wheels on the said driving shaft and the said sprocket wheels removed from the said driving shaft; a plurality of guide rods extended in a single span between the axles of said vehicle parallel with the ground and in a single plane; reciprocating cross heads slidably mounted on said guide rods to move parallel with the ground; suitable connecting devices connecting the said heads with the said chains; thrust poles pivoted to said heads adapted to thrust against the ground to arrest the motion of said heads; and adjustable lifting devices to raise the said poles out of engagement with the ground.

2. A vehicle traction mechanism comprising a motor; a driving shaft mounted crosswise on said vehicle provided with sprockets; sprockets mounted on said vehicle at the end thereof removed from said driving shaft; endless sprocket chains mounted on said sprockets and extended between the same; a plurality of guide rods extended in a single span between the axles of said vehicle parallel with the ground and in a single plane; reciprocating cross heads mounted on the said guide rods and having antifriction devices bearing against the under side of said rods; devices connecting the said heads with said chains; thrust poles pivotally connected to said heads and adapted to thrust against the ground to arrest the motion of said heads; and adjustable lifting devices adapted to raise the said poles out of engagement with the ground.

In testimony whereof I have signed my name to this specification in the presence of two subscribing witnesses.

JOHN LEONIDAS WILLIAMS.

Witnesses:
L. W. DRUMMOND,
P. J. HUDSON.